United States Patent [19]
Erwin et al.

[11] 3,898,488
[45] Aug. 5, 1975

[54] ELECTRIC MOTOR CONSTRUCTION

[75] Inventors: Robert D. Erwin, Speedway; Richard H. Weber; Bill G. Kilmer, both of Indianapolis; Benjamin F. Chestnut, Greenwood, all of Ind.

[73] Assignee: P. R. Mallory & Co. Inc., Indianapolis, Ind.

[22] Filed: Feb. 4, 1974

[21] Appl. No.: 439,461

Related U.S. Application Data

[63] Continuation of Ser. No. 229,808, Feb. 28, 1972, abandoned.

[52] U.S. Cl. .................. 310/83; 310/164; 310/156; 310/41
[51] Int. Cl.[2] .......................................... H02K 7/10
[58] Field of Search ...................... 310/41, 162–164, 310/156, 172, 83

[56] References Cited
UNITED STATES PATENTS
3,231,770  1/1966  Hyde.................................. 310/156
3,473,058  10/1969  Landgraf et al. ..................... 310/41

*Primary Examiner*—Donovan F. Duggan
*Attorney, Agent, or Firm*—Charles W. Hoffmann; Robert F. Meyer; Richard H. Childress

[57] ABSTRACT

A U-shaped outer field plate is inverted over a rectangular mounting plate to form an enclosure linearly extending to an area near the center of the mounting plate. The enclosure provides a space for an energizing winding, an inner field plate, and a permanent magnet rotor. At least one shaft extends from the mounting plate juxtaposition the enclosure and carries at least one gear for a speed reduction means. The poles of the motor are asymmetrically arranged to provide good motor starting characteristics without substantial loss of running torque.

9 Claims, 4 Drawing Figures

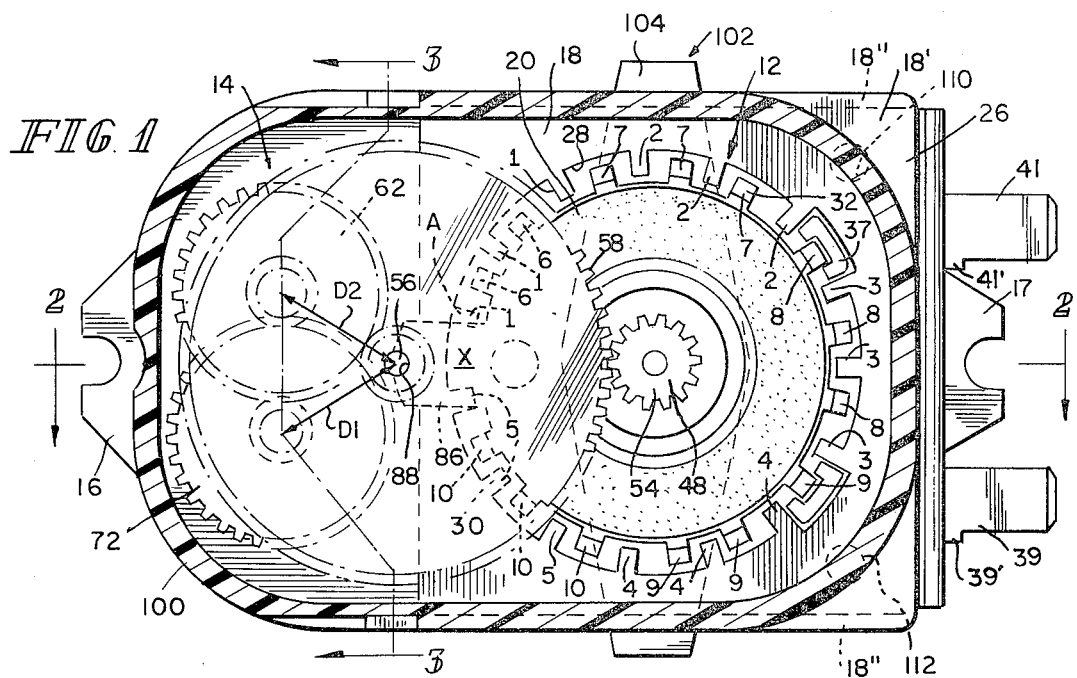
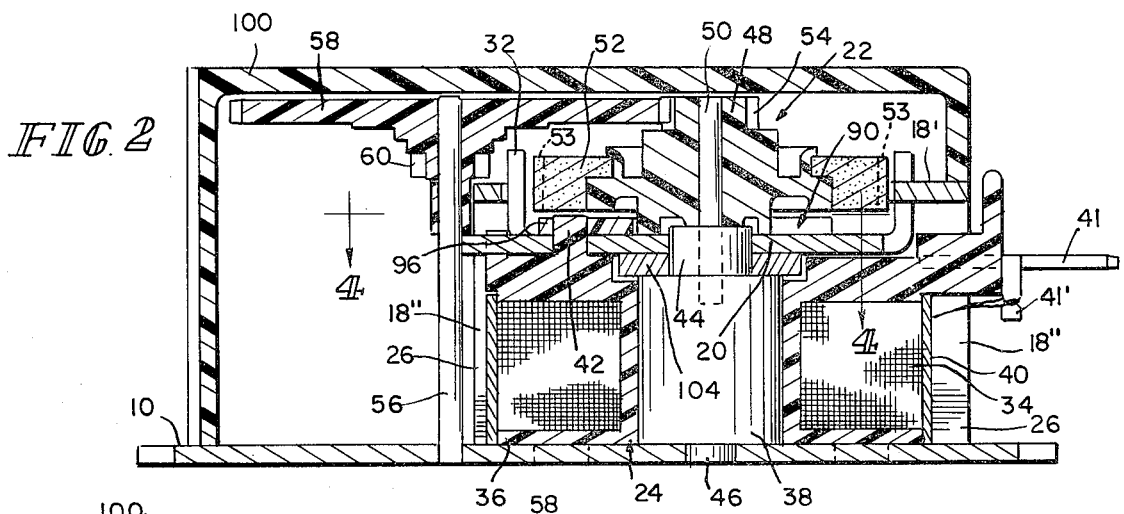
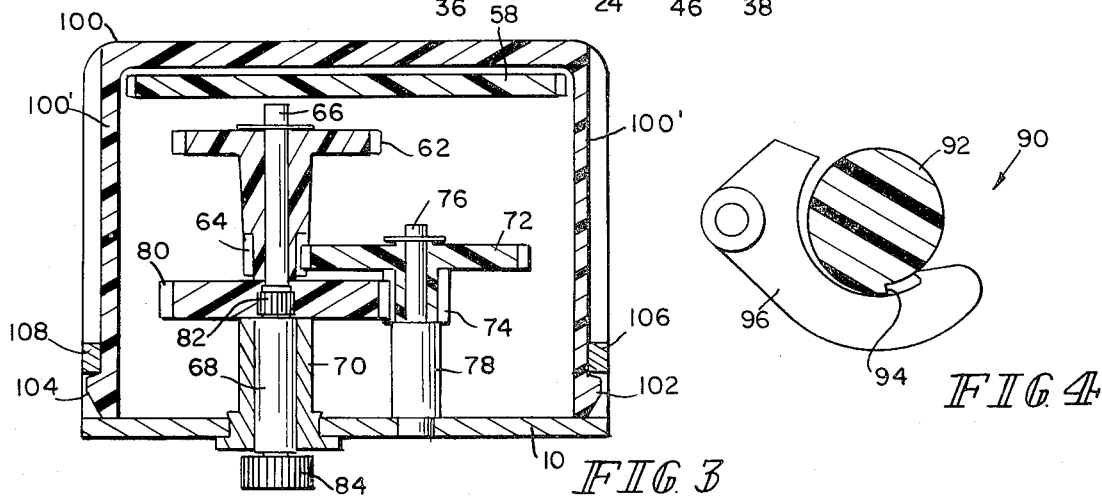

ELECTRIC MOTOR CONSTRUCTION

This is a continuation of application Ser. No. 229,808 filed Feb. 28, 1972 now abandoned.

The present invention relates to an electric motor construction; and more particularly to the combination of a synchronous motor and a speed reduction means which are packaged together in a small, neat, and compact manner.

There are a multitude of applications for small synchronous motors of the type having a permanent magnet rotor. Many of the applications are in timing devices such as clocks, and appliances such as washers, dryers, ranges, and ovens which utilize time sequence switches. For the most part, the synchronous motors are used in conjunction with speed reducing mechanisms in order to reduce the speed of the motor to an acceptable rotational speed. In many applications, such as in ranges, for example, the space available for the timing mechanisms and thus the synchronous motor with its speed reduction means is very limited. In ranges, for example, the timing mechanism, along with the synchronous motor and speed reducing means must be confined in a small space in a control panel of the range. This, of course, leads to the problem of providing a construction which is neat and compact without any loss of efficiency or alignment of parts.

Regardless of the requirement that the motors be made smaller and smaller, it is still desirable, if not mandatory, that they exhibit good starting characteristics without substantial loss of available running torque.

The present invention is concerned with an electric motor construction and has as an object the provision of a synchronous motor which is relatively small in size, neat and compact.

Another object of the invention is the provision of an electric motor construction which is neat and compact and which exhibits good starting characteristics without substantial loss of available running torque.

Another object of the invention is to provide an electric motor construction which includes a synchronous motor in combination with a speed reducing means both packaged in a neat, compact unit.

A further object of the invention is to provide an electric motor construction including, in combination, a synchronous motor and a speed reducing means both carried on a rectangular mounting plate.

Yet another object of the invention is to provide an electric motor construction including a speed reducing means wherein the motor includes a U-shaped outer field plate having upstanding legs, the distal ends of the legs engaging a mounting plate to provide an enclosure linearly extending to an area near the center of the mounting plate with the gear reduction means including at least one gear carried by a shaft which extends from the mounting plate juxtaposition the enclosure.

Still another object of the invention is the provision of an electric motor construction including a gear reduction means wherein the center distance between at least two of the gear reduction stages is substantially the same so that two output positions are available.

Another object of the invention is the provision of an electric motor construction including a gear reduction means wherein there is a means locating and maintaining the center distance between a gear of the reduction means in a rotor of the motor.

A further object of the invention is the provision of an electric motor construction having an asymmetrical pole arrangement for good starting characteristics without substantial loss of running torque.

These and other objects of the invention will become apparent from the following description taken in conjunction with the accompanying drawings wherein:

FIG. 1 is a top view of the electric motor construction with portions thereof being removed for clarity;

FIG. 2 is a view taken along the line 2—2 of FIG. 1;

FIG. 3 is a section taken along the line 3—3 of FIG. 1;

FIG. 4 is a view taken along the line 4—4 of FIG. 2.

Generally speaking, the objects of the invention are accomplished by providing an electric motor construction comprising, in combination, a substantially rectangular mounting plate, a U-shaped outer field plate having a substantially flat-bottom portion and upstanding legs extending therefrom, the distal ends of the legs engaging the mounting plate to provide an enclosure linearly extending to an area near the center of the mounting plate, an aperture disposed in the flat-bottom portion, and poles provided in the U-shaped outer field plate extending into the aperture; an energizing winding carried by the mounting plate within the enclosure; an inner field plate disposed above the energizing winding and having poles intermeshing the poles of the U-shaped outer field plate; a permanent magnet rotor disposed above said energizing winding and rotatable within said intermeshed poles and having a plurality of spaced magnetic poles along its periphery; at least one shaft extending from the mounting plate juxtaposition the enclosure; a speed reduction means including at least one gear rotatably journalled on the shaft; and means operably connecting the rotor with the speed reduction gear.

An asymmetrical pole arrangement provides good motor starting characteristics without substantial loss of running torque.

There is also provided a means to locate and maintain the center distance between the rotor and the speed reduction gear. The speed reduction gear could be the first stage gear of a four stage gear reduction assembly wherein the center distance between the first stage and at least two of the other stages are substantially the same such that two outputs may be provided.

Referring now to the drawings, mounting plate 10 provides a base upon which a motor section 12 and speed reducing section 14 may be carried. The mounting plate 10 is substantially rectangular in shape and includes a pair of ears 16 and 17 which may be used to mount the electric motor construction to a panel.

Motor section 12 is generally of the synchronous motor type and includes an outer field plate 18, inner field plate 20, permanent magnet rotor 22, and an energizing winding 24.

The outer field plate 18 is substantially U-shaped with a flat bottom portion 18' and a pair of opposed upstanding legs 18'' extending therefrom. The distal ends of the upstanding legs engage mounting plate 10 to provide an enclosure 26 extending linearly to an area near the center of the mounting plate. There is an aperture 28 provided in the flat-bottom portion 18' into which a plurality of poles 30 extend more or less generally in a circular fashion. A suitable material for the field plate would include, for example, ordinary cold rolled steel, preferably annealed.

The inner field plate 20 includes a substantially flat plate having integral poles 32 formed therefrom by lancing radial strips out of the plate. The poles are bent upwards to be intermeshed with the poles 30 of the outer field plate. The inner field plate may also be fabricated from cold-rolled steel, preferably annealed.

Energizing winding 24 includes a bobbin 36 surrounding an iron core 38 and a coil 34 of a predetermined number of turns of wire carried by the bobbin. The coil is electrically insulated and protected by a cover 40 of a suitable fabric. The bobbin 36 also includes at least one post 42 which serves to locate a pawl 96 of a directional system to be described, and at least one channel 37 to locate the inner field plate. Iron core 38 includes a hub portion 44 which carries the inner field plate 20 and stud 46 which serves to connect the core to the mounting plate 10. Electrical terminals 39 and 41 are carried by bobbin 36 and include tabs 39' and 41' around which wires of the coil may be wound.

Permanent magnet rotor 22 includes hub 48 which is rotatably carried on a shaft 50, permanent magnet 52 and an output pinion 54 which is formed as part of the hub 48. Shaft 50 is rigidly held in iron core 38. The permanent magnet 52 may be fabricated of a material of a relatively high energy product partial oriented ceramic, such as a barium ferrite ceramic magnet with its outer periphery being impressed or magnatized into separate pole segments 53 of alternate sets of poles of north and south polarity. As shown, the rotor is disposed within the intermeshed poles of the inner and outer field plates and rotatable therein.

In order to provide good starting characteristics without substantial loss of running torque for the synchronous motor, the pole arrangement of the motor is asymmetrically arranged. Asymmetry may be provided by arranging either the poles of the field plates or the rotor asymmetrically. In the embodiment shown the poles of the outer and inner field plates are asymmetrically arranged.

Referring specifically to FIG. 1, beginning from a suitable pole, such as pole A in the outer field, there are five groups (1–5) of poles symmetrically spaced with three poles in each group. All of the poles are of equal size. In each group there are two "running poles"; that is, poles which primarily contribute to the running torque of the motor. The remaining pole in each group are what might be termed a "starting pole" since it primarily contributes to the starting of the motor. It is identifiable by its spacing from the rest of the poles in the group. In this present arrangement the center poles of a group are starting poles and are off-set $1/12\ \alpha$ degrees, wherein $\alpha$ equals 2 pole pitches, a pole pitch being defined as $360°/n$, n being the number of rotor poles. In the present embodiment, there are 30 rotor poles such that the starting poles would be off-set 2°. Thus rather than having each pole spaced 24° apart, the spacing between the poles within a group are 26° and 22°.

The spacing of the poles of the inner field plate follow essentially the same pattern. There are 5 groups (6–10) of three poles each, all of the poles being of equal size, with the groups being symmetrically spaced. However, in this particular embodiment, space X was needed for arm 86 extending from the inner field plate, the function of which will be later described. Therefore, the pole occupying such space was deleted at a slight loss in running torque. In a manner similar to that of the outer field plate, a starting pole is located between two outer running poles in each group. The starting poles for the inner plate being off-set $1/6\ \alpha$ degrees, wherein $\alpha$ again equals 2 pole pitches. Thus where the rotor has 30 poles, the starting poles would be off-set 4°. That is, rather than having each pole within a group spaced 24° apart, the spacing between the poles would be 28° and 20°.

As previously noted, the same asymmetry may be achieved in the rotor poles as in the stator or field poles. Thus, alternate poles of the rotor could have the spacing configuration of the outer field plate, while the other poles would have the configuration of the inner plate.

Speed reduction section 14 includes at least one shaft 56 extending from the mounting plate 10 juxtaposition the enclosure 26 provided by the outer field plate 18 and mounting plate 10. Shaft 56 is primarily supported solely by the mounting plate 10, the shaft being cantilevered to the plate. At least one speed reduction gear 58 is rotatably journalled to and carried by the shaft 56. Gear 58 meshes with pinion 54 carried by the hub 48 of the rotor 22. While a single speed reduction stage may be sufficient for some applications, the present motor construction contemplates four reduction stages. The first stage includes speed reduction gear 58 and pinion 60. The second stage includes speed reduction gear 62 and pinion 64, both of which are carried by shaft 66. Shaft 66 rotates within sleeve 68 which is carried in bushing 70. As shown, speed reduction gear 62 and pinion 64 are integral and freely rotate about the shaft 66. The third stage includes speed reduction gear 72 and pinion 74. Gear 72 and pinion 74 rotate about shaft 76 and are maintained at a desired elevation by sleeve 78 surrounding the shaft. The fourth stage includes speed reduction gear 80 which is fixedly held to the shaft 66 by some suitable means such as through knurl 82, secured to the shaft 66 is the motor output pinion 84. In the present embodiment, the center distance $D_1$ between the first and third stages is substantially the same as the center distance $D_2$ between the first and second or fourth stages. For this reason, the output 84 could be switched with the third stage position, and, therefore, two output stations are available. The center distance between the first stage gear 58 and the rotor pinion 54 is accurately located and maintained through an arm 86 having a notch 88 which partially surrounds the shaft 56. Arm 86 is formed integral with the inner field plate 20.

In synchronous motors on the type described, the rotor will turn in either a clockwise or counterclockwise direction when an AC current is applied to the coil 34. In order to insure that the rotor will operably rotate in only one direction, the present rotor construction employs a one-way directional means 90. One-way directional means 90 includes a cam 92 carried by hub 48 and having an arcuate step 94, and pawl 96 pivotly carried by post 42. With the rotor turning in the proper direction (clockwise) cam 92 will bias the pawl away from the cam. However, should the rotor begin to turn in the wrong direction, step 94 will engage the pawl stopping the rotor from its wrong directional turn. The inertia of the rotor will then cause it to rebond to rotate in a proper direction.

A shroud 100 covers substantially the entire motor and speed reduction sections to aid in keeping dust and other deleterious matter from the structures. In addition the shroud aids in keeping the gears and other mechanism within a confined area. The side walls 100' of the shroud are flexible and include ribs 102 and 104 such that the walls may be flexed to engage the ribs with tabs 106 and 108 extending from the outer field plate thus securing the shroud in place. The shroud also includes posts 110 and 112 which engage apertures in outer field plate 18 (not shown) to guide and align the shroud.

It can be seen that the present motor construction is neat and compact. Exact alignment of the field plates, rotor, and winding are readily achieved as a unit, with alignment of the speed reducing section being independently made in relation to the motor section.

In operation, when an AC current is applied to the winding 24, the rotor of the motor will begin to rotate due to the magnetic flux generated between the rotor poles and the field poles with good starting characteristics being achieved by the asymmetrical arrangement of the field poles. The one-way directional system, previously described, will assure operable rotation of the rotor in the right direction. The speed reduction means will change the rotor output to a desired rotational speed to be applied to motor output pinion 84.

For those applications where a buzzer is needed, for example in a range timer, a buzzer means 102 is provided. Buzzer means 102 includes an arm 104 extending from iron core 38. During operation of the motor, when another arm (not shown) is brought near or into engagement with arm 104, the arms will vibrate against each other due to the magnetic flux induced in arm 104.

What is claimed is:

1. An electric motor construction comprising:
   a. a substantially rectangular mounting plate,
   b. a U-shaped outer field plate having a substantially flat bottom portion and upstanding legs extending therefrom, said U-shaped outer field plate disposed over said mounting plate to provide an enclosure linearly extending to an area near the center of said mounting plate, an aperture disposed in said flat-bottom portion, and poles provided in said U-shaped outer field plate extending into said aperture,
   c. an energizing winding carried by said mounting plate within said enclosure,
   d. an inner field plate disposed above said energizing winding having poles intermeshing said poles of said U-shaped outer field plate,
   e. a permanent magnet rotor disposed above said energizing winding and rotatable within said intermeshed poles and having a plurality of magnetic poles along its periphery,
   f. at least one shaft extending from said mounting plate juxtaposition said enclosure,
   g. a speed reduction means including at least one gear rotatably journalled on said shaft,
   h. an arm extending from said inner field plate and a notch in a distal end of said arm at least partially surrounding said shaft so as to provide a means for locating the center distance between said gear and said rotor, and
   i. means operably connecting said rotor with said speed reduction gear.

2. An electric motor construction according to claim 1 wherein said energizing winding includes an iron core, a bobbin surrounding said core, and a coil carried by said bobbin.

3. An electric motor construction according to claim 2 wherein said bobbin includes means to locate said outer and inner field plates.

4. An electric motor construction according to claim 3, wherein said locating means includes at least one channel protruding from said bobbin extending adjacent to said outer and inner field plates.

5. An electric motor construction according to claim 1, further including one-way directional means to prevent a continued wrong-way directional rotation of said rotor.

6. An electric motor construction according to claim 1, wherein said speed reducing means includes four reduction stages.

7. An electric motor construction according to claim 6, wherein said four stages includes a first stage gear and pinion rotatably carried on said shaft, a second stage gear and pinion rotatably carried on a second shaft rotatably journalled to said mounting plate, a third stage gear and pinion rotatably journalled on a third shaft, and a fourth stage gear fixedly coupled to said second shaft.

8. An electric motor construction according to claim 7 wherein the center distance between said first stage gear and pinion and said third stage gear and pinion is substantially the same as the center distance between said first stage gear and pinion and said fourth stage gear.

9. An electric motor construction according to claim 1, further including a shroud substantially enclosing said field plates, said permanent magnet rotor, said energizing winding, and said speed reducing means.

\* \* \* \* \*